UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE VAT DYES.

1,090,621.  Specification of Letters Patent.  Patented Mar. 17, 1914.

No Drawing.  Application filed October 1, 1912. Serial No. 723,307.

*To all whom it may concern:*

Be it known that I, MAX HENRY ISLER, citizen of the Swiss Republic, residing at Mannheim, Germany, have invented new and useful Improvements in Anthraquinone Vat Dyes, of which the following is a specification.

I have discovered new vat coloring matters of the anthraquinone series which are anthraquinone-diaryl-dithiazoles and possess a constitution corresponding to the formula

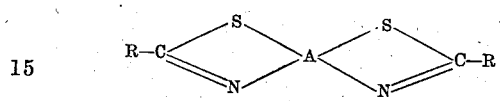

in which A represents the anthraquinone residue and R represents an aryl residue, including those of the benzene, naphthalene and anthraquinone series. I can obtain my new compounds by treating 1.5-dimercapto-2.6-diamino-anthraquinone, or 1.8-dimercapto-2.7-diamino-anthraquinone, with an aryl aldehyde or with a corresponding omega-dihalogen-methyl compound, or equivalent body. If the reaction be carried out under sufficiently mild conditions, an intermediate product is produced which is probably a dihydro-dithiazole, and is convertible, by treatment with an oxidizing agent, or even by standing with concentrated sulfuric acid, into the anthraquinone-diphenyl-dithiazole, or this latter can be directly produced if the reaction is allowed to continue for some time at a higher temperature, or in the presence of an oxidizing agent, either organic or inorganic. Instead of employing either of the aforesaid dimercapto-diamino-anthraquinones, the corresponding dihalogen-diamino-anthraquinone can sometimes be employed, if the condensation be carried out in the presence of a body (such, for instance, as a polysulfid) which is capable of replacing the halogen atom by the S, or the SH, residue.

My new compounds consist, when dry, of yellow powders which are insoluble in dilute acids and alkalis, but are soluble in concentrated sulfuric acid giving reddish yellow solutions, and dye cotton, from a hydrosulfite vat, yellow to yellow-orange shades.

The following examples will serve to illustrate further the nature of my invention and how it can be carried into practical effect, but the invention is not confined to these examples. The parts are by weight.

Example 1: Boil together, in a reflux apparatus, 50 parts of 2.6-diamino-anthraquinone-1.5-dimercaptan, 100 parts of benzaldehyde, and 750 parts of pyridin, or of nitrobenzene, until a test portion of the product dissolves in concentrated sulfuric acid, forming a yellow solution. Filter off the reaction product when cold and wash it with cold nitrobenzene, whereupon a yellow vat dye is obtained which is insoluble in dilute acids and alkalis and in the usual solvents when cold. It can be obtained in the pure state by recrystallization from, for instance, boiling nitrobenzene. In concentrated surfuric acid it yields a reddish yellow solution and, after being precipitated by means of water and treated with sodium hypochlorite, it yields a paste which, from a hydrosulfite vat, dyes yellow shades. In this example, instead of benzaldehyde, benzal chlorid, benzotrichlorid, or benzoyl chlorid, can be employed. The pure vat coloring matter obtainable according to this example, when analyzed, yields results which point to its possessing a constitution corresponding to the formula

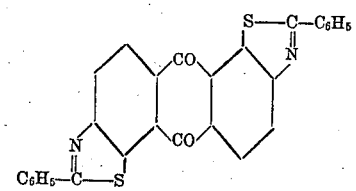

| | Found: | | Theory: |
|---|---|---|---|
| N | 5.66% | 5.89% | 5.9% |
| S | 13.59% | 13.63% | 13.5% |

Example 2: Condense together, at a temperature of from 50° to 60° C., 50 parts of 2.6-diamino-anthraquinone-1.5-dimercaptan, from 250 to 500 parts of pyridin, and 40 parts of benzaldehyde. The reaction proceeds very easily and is stopped when a test portion of the isolated product yields a green solution, and not a yellow solution, immediately on being dissolved in concentrated sulfuric acid. The brown reaction product yields a green solution in sulfuric acid, which solution however very rapidly becomes yellow, and the whole of this brown reaction product can be converted into the anthraquinone-diphenyl-dithiazole by treating it with from five to ten times its weight of 96% sulfuric acid, at ordinary temperature, until the mass becomes yellow, then pouring into water and filtering off and washing the coloring matter.

Example 3: Heat together, in a closed vessel, for a few hours, at from 120° to 130° C., 50 parts of 2.6-diamino-1.5-dichlor-anthraquinone (preferably in the form of a finely divided paste), from 500 to 1,000 parts of sodium polysulfid solution (obtained from 250 parts of crystallized sodium sulfid, 400 parts of water, 30 parts of sulfur and 400 parts of alcohol), and 100 parts of benzaldehyde. Isolate the coloring matter in the usual way. If desired, it can be purified by treating it for a short time with sodium hypochlorite, or by recrystallization from nitrobenzene. It is identical with the product of the foregoing Example 2.

In a similar manner to that described in the foregoing examples, coloring matter can be obtained from 2.7-diamino-anthraquinone-1.8-dimercaptan. Further, similar products can be obtained by condensing anthraquinone-aldehyde or omega-dihalogen-2-methyl-anthraquinone or anthraquinone-carboxylic-acid chlorid with either of the aforesaid dimercapto-diamino-anthraquinones.

Now what I claim is:—

1. The new vat dyes of the anthraquinone series being anthraquinone-di-aryl-dithiazoles, which possess a constitution corresponding to the formula

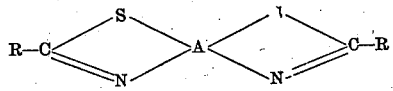

in which A represents an anthraquinone residue and R an aryl residue, which new vat dyes consist, when dry, of yellow powders which are insoluble in dilute acids and alkalis, but are soluble in concentrated sulfuric acid giving reddish yellow solutions, and dye cotton, from a hydrosulfite vat, yellow to yellow-orange shades.

2. The new coloring matter of the anthraquinone series which is 1.2.5.6-anthraquinone-diphenyl-dithiazole, which possesses a constitution corresponding to the formula

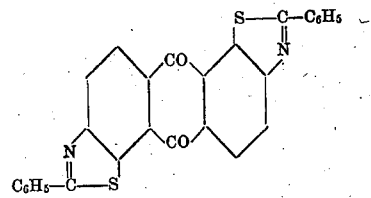

which consists, when dry, of a yellow powder, which is insoluble in dilute acids and alkalis, but is soluble in concentrated sulfuric acid giving a reddish yellow solution, and dyes cotton, from a hydrosulfite vat, yellow shades.

In testimony whereof I have hereunto set my hand in the presence of two subscribing witnesses.

MAX HENRY ISLER.

Witnesses:
J. ALEC. LLOYD,
JOSEPH HEIFFER.